(12) United States Patent
Wang et al.

(10) Patent No.: US 12,511,067 B2
(45) Date of Patent: Dec. 30, 2025

(54) INDEX CREATION METHOD, COMPUTING DEVICE, AND STORAGE MEDIUM

(71) Applicant: HANGZHOU ALICLOUD FEITIAN INFORMATION TECHNOLOGY CO., LTD., Hangzhou (CN)

(72) Inventors: Rui Wang, Bellevue, WA (US); Yu Du, Shanghai (CN); Peng Xu, Hangzhou (CN); Zhongjie Wu, Beijing (CN); Jiesheng Wu, Bellevue, WA (US)

(73) Assignee: HANGZHOU ALICLOUD FEITIAN INFORMATION TECHNOLOGY CO., LTD., Hangzhou (CN)

(*) Notice: Subject to any disclaimer, the term of this patent is extended or adjusted under 35 U.S.C. 154(b) by 25 days.

(21) Appl. No.: 18/685,090

(22) PCT Filed: Oct. 9, 2022

(86) PCT No.: PCT/CN2022/124079
§ 371 (c)(1),
(2) Date: Feb. 20, 2024

(87) PCT Pub. No.: WO2023/082902
PCT Pub. Date: May 19, 2023

(65) Prior Publication Data
US 2024/0345753 A1    Oct. 17, 2024

(30) Foreign Application Priority Data
Nov. 10, 2021 (CN) .......................... 202111324284.6

(51) Int. Cl.
*G06F 3/06* (2006.01)
(52) U.S. Cl.
CPC .......... *G06F 3/0644* (2013.01); *G06F 3/0604* (2013.01); *G06F 3/067* (2013.01)

(58) Field of Classification Search
CPC ...... G06F 3/0644; G06F 3/0604; G06F 3/067; G06F 3/0608; G06F 3/064; G06F 3/0652;
(Continued)

(56) References Cited

U.S. PATENT DOCUMENTS 10,037,778 B1   7/2018 Farhan et al.
2020/0301899 A1*  9/2020 Tu .................... G06F 16/2453
(Continued)

FOREIGN PATENT DOCUMENTS

| CN | 111459884 A | 7/2020 |
|----|-------------|--------|
| CN | 112817980 A | 5/2021 |

(Continued)

OTHER PUBLICATIONS

International Search Report for PCT/CN2022/214079 entitled "Index Creation Method, Computing Device, and Storage Medium", mailed Dec. 15, 2022 (4 pages with English-language translation).
(Continued)

*Primary Examiner* — Apu M Mofiz
*Assistant Examiner* — Oscar Wehovz
(74) *Attorney, Agent, or Firm* — Clark Hill PLC

(57) ABSTRACT

An index creation method, a computing device, and a storage medium are provided. The method comprises: dividing storage records in logic sub-storage areas on the basis of the storage records and the logic sub-storage areas in a logic storage area divided in a physical storage area, the storage records comprising storage data; determining, from among multiple preset index formats according to the divided storage records, an index format matched with a record attribute; and creating a corresponding sub-index according to the determined index format to search for storage records according to the sub-index, the index format being able to cause the generated corresponding sub-index to occupy memory space smaller than a preset capacity. The index
(Continued)

format matched with the record attribute is determined from among the multiple preset index formats, the index format can cause the generated corresponding sub-index to occupy memory space smaller than the preset capacity.

20 Claims, 4 Drawing Sheets

(58) Field of Classification Search
CPC ... G06F 3/0683; G06F 16/2228; G06F 16/245
See application file for complete search history.

(56) References Cited

U.S. PATENT DOCUMENTS

| | | | |
|---|---|---|---|
| 2020/0328959 A1* | 10/2020 | Cheng | H04W 56/001 |
| 2023/0342293 A1* | 10/2023 | Du | G06F 3/067 |
| 2024/0283463 A1* | 8/2024 | Yu | G06F 3/0688 |

FOREIGN PATENT DOCUMENTS

| | | |
|---|---|---|
| CN | 113535092 A | 10/2021 |
| CN | 113778345 A | 12/2021 |

OTHER PUBLICATIONS

Written Opinion for PCT/CN2022/214079 entitled "Index Creation Method, Computing Device, and Storage Medium", dated Dec. 15, 2022 (4 pages).

* cited by examiner

INDEX CREATION METHOD, COMPUTING DEVICE, AND STORAGE MEDIUM

This is an application under 35 U.S.C. § 371 of International Application No. PCT/CN2022/124079 filed Oct. 9, 2022, entitled "Index Creation Method, Computing Device, and Storage Medium", which claims priority to Chinese patent application No. 202111324284.6 filed with the Chinese Patent Office on Nov. 10, 2021, and entitled "Index Creation Method, Computing Device, and Storage Medium", which is incorporated herein by reference in its entirety.

TECHNICAL FIELD

The present application relates to a field of storage technology, and in particular, relates to an index creation method, a computing device, and a storage medium.

BACKGROUND

Cloud storage services may provide a data storage functionality to a user, and also need to provide the use with functionalities such as searching, deletion, and data insertion of storage data. In order to provide such functionalities, the cloud storage services also maintain an index for data localization, which is used to locate and search for the storage data through the mapping of the index. However, for improving performance, the mapping of the index needs to reside in a memory. This may require the utilization of a higher amount of memory, resulting in higher memory consumption.

SUMMARY

A plurality of aspects of the present application provide an index creation method, a computing device, and a storage medium for saving memory consumption while implementing an indexing functionality.

Embodiments of the present application provide an index creation method, including: dividing, based on a storage record and a logical sub-storage area of a logical storage area divided over a physical storage area, a storage record in the logical sub-storage area, the storage record comprising storage data; determining, according to the divided storage record, an index format matching a record attribute from a plurality of preset index formats; creating a corresponding sub-index according to the determined index format to perform a lookup on the storage record according to the sub-index, the index format causing the created corresponding sub-index to occupy a memory space less than a preset capacity.

The embodiments of the present application further provide a computing device, including a memory and a processor; the memory being used for storing a computer program; the processor being used for executing the computer program to: divide, based on a storage record and a logical sub-storage area of a logical storage area divided over a physical storage area, a storage record in the logical sub-storage area, the storage record comprising storage data; determine, according to the divided storage record, an index format matching a record attribute from a plurality of preset index formats; create a corresponding sub-index according to the determined index format to perform a lookup on the storage record according to the sub-index, the index format causing the created corresponding sub-index to occupy a memory space less than a preset capacity.

The embodiments of the present application further provide a computer-readable medium stored with a computer program which, when executed by one or more processors, enables the one or more processors to implement steps in the method above.

The embodiments in the present application further provide a computer program product, including a computer program or an instruction, wherein the computer program, when executed by a processor, enables the processor to implement steps in the method above.

The foregoing summary is for purposes of illustration only and is not intended to be limiting in any way. In addition to the illustrative aspects, embodiments and features described above, further aspects, embodiments and features of the present application will be readily apparent by reference to the accompanying drawings and the following detailed description.

BRIEF DESCRIPTION OF THE DRAWINGS

The accompanying drawings illustrated here are used to provide further understanding of the present application, constituting a part of the present application. The schematic embodiments of the present application and the description thereof are used to illustrate the present application, not constituting improper limitation on the present application. In the accompanying drawings.

DETAILED DESCRIPTION

In order to make the objects, technical solution and advantages of the embodiments of the present application clearer, the technical solution of the present application will be described clearly and completely below in conjunction with the embodiments and accompanying drawings in the present application. It is obvious that the described embodiments are only some of the embodiments of the present application, rather than all of them. Based on the embodiments of the present application, all other embodiments obtained by those skilled in the art without involving any creative efforts fall within the scope of protection of the present application.

It may be known according to the preceding text that in order to better help a user to search for corresponding storage data rapidly, it is necessary to provide a corresponding index. However, the index reside in a memory, and a substantial amount of memory will be consumed when the corresponding storage data is searched for through the index.

On this basis, the embodiments of the present application provide an index creation method, a computing device, and a storage medium, which can reduce memory consumption and support the indexing functionality.

The index creation processes will be illustrated in a detailed manner in conjunction with method embodiments.

Figure 1:
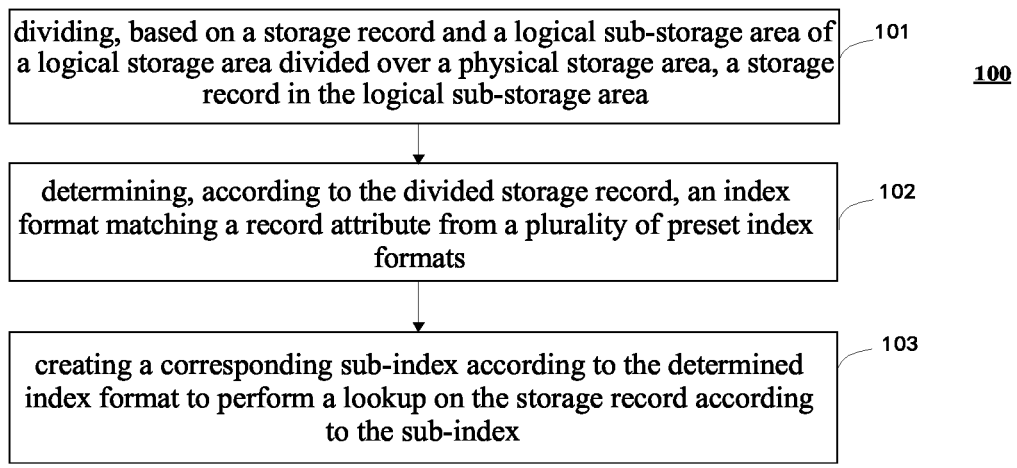
FIG. 1 is a schematic flow diagram of an index creation method in an embodiment of the present application.

FIG. 1 is a schematic flow diagram of an index creation method in an embodiment of the present application. The method 100 provided in the embodiments of the present application is executed by a computing device, such as a cloud server. The method 100 includes the following steps:

Step S101: dividing, based on a storage record and a logical sub-storage area of a logical storage area divided over a physical storage area, a storage record in the logical sub-storage area.

The storage record includes storage data.

Step S102: determining, according to the divided storage record, an index format matching a record attribute from a plurality of preset index formats;

Step S103: creating a corresponding sub-index according to the determined index format to perform a lookup on the storage record according to the sub-index.

The index format causes the created corresponding sub-index to occupy a memory space less than a preset capacity.

It should be noted that a subject executing the method 100 may be a cloud server, and a specific deployment may be a cloud storage record engine on the cloud server.

In the embodiments of the present application, a storage record in a logical sub-storage area is divided based on a storage record and the logical sub-storage area of a logical storage area divided over a physical storage area, the storage record includes storage data; an index format matching a record attribute is determined from a plurality of preset index formats according to the divided storage record; a corresponding sub-index is created according to the determined index format to perform a lookup on the storage record according to the sub-index, the index format causes the created corresponding sub-index to occupy a memory space less than a preset capacity.

By determining, according to the divided storage record, an index format matching a record attribute from a plurality of preset index formats, and the index format causing the created corresponding sub-index to occupy a memory space less than a preset capacity, the memory space occupied by the created corresponding index is less than the preset capacity, which can save a certain amount of memory space and at the same time may also ensure the implementation of the index functionality.

The above steps are illustrated in a detailed manner below:

Step S101: dividing, based on a storage record and a logical sub-storage area of a logical storage area divided over a physical storage area, a storage record in the logical sub-storage area.

The storage record includes storage data. For example, a user stores a document on a cloud server. Content data in the document may serve as storage data which may be divided into a plurality of segments or a plurality of copies. Each segment or each copy of the storage data may serve as a corresponding storage record. Corresponding storage data is recorded in the storage record.

Relatively, a storage record or a record to be stored is an underlying physical storage device stored in a computing device, and specifically may be an SSD (solid state drive) or an open-channel solid-state drive (a solid-state drive). A hard disk is composed of sectors. For more convenient management and utilization of the underlying physical storage device, the sectors may be grouped or divided, and a plurality of sectors may form a physical storage area, which may specifically be a super block on a hard disk. In addition, logically, the above physical storage area may provide a logical storage area for logic storage management. The logical storage area may be a chunk. Accordingly, a document stored by a user, for example, may be stored in a super block on the hard disk, and at the same time, logically stored on a chunk in the super block.

Before stored, the storage record is a record to be stored, and its storage process may include: acquiring a record to be stored (this may be implemented through a cloud server), and storing the record to be stored in a logical storage area corresponding to the physical storage area.

According to the preceding text, for example, a user may log in to the login interface of a cloud server via the web browser of a computer. The user logs in through the login interface which then skips to a storage service interface. Through the interface, the user sends a storage request to the cloud server. The request performs data storage, such as storing a document, by call the API (Application Programming Interface) provided by the cloud server (the request can carry a stored document, or a segment of the stored document). After receiving the request, the cloud server call the API interface to store the document according to the above-described manner, and can store it on a chunk corresponding to a super block provided by the hard disk. After the storage is completed, the storage record including storage data is obtained. A cloud storage record engine may perform processing on the basis of storage records, such as first obtaining these storage records or reading these storage records, and then performing division and index creation.

In the process of data storage, since there may be storage concurrency, when data is stored, there may be a storage block whose provision of storage cannot be accomplished by a corresponding super block. That is, a super block may correspond to a plurality of chunk segments of chunks. Namely, in a super block, a corresponding logical storage space or logical sub-storage area may be provided for each storage request (e.g., in the event of a request for concurrent write or a request for storage). However, it is possible that the logical storage space or logical sub-storage area cannot completely store the storage data in a corresponding request, such that it is necessary to initiate other super blocks to continue storing other storage data in the corresponding request. Accordingly, a plurality of logical storage spaces or a plurality of logical sub-storage areas where data are stored in the corresponding request may be stored in different super blocks. Thus, the plurality of logical storage spaces or the plurality of logical sub-storage areas may form a chunk. The logical storage spaces or logical sub-storage areas may also be referred to as chunk segments of the chunk.

Accordingly, a division on the basis of a logical storage area over a physical storage area is realized, and a logical sub-storage area corresponding to the logical storage area is determined, which will not be repeated here since it has already been elaborated above. It is only illustrated that the size of a chunk is generally measured in MB, e.g., 64 MB. In the storage process of a chunk, consecutive storage records are logically adjacent (e.g., the offset is consecutive. That is, logical positions or logical addresses are consecutive). Within the chunk, the initial offset is equal to the cut-off offset of the preceding storage record (if there is a preceding storage record). The initial offset of the first storage record within the chunk is zero. The logical size of a storage record is defined as an offset between the initial offset and the cut-off offset. The upper limit of the logical size of the storage record may be measured in MB, e.g., 8 MB. Therefore, a key (Key) of the storage record is a combination of a chunk identifier (e.g., ID, Identification) and an initial offset within the chunk.

Figure 2:
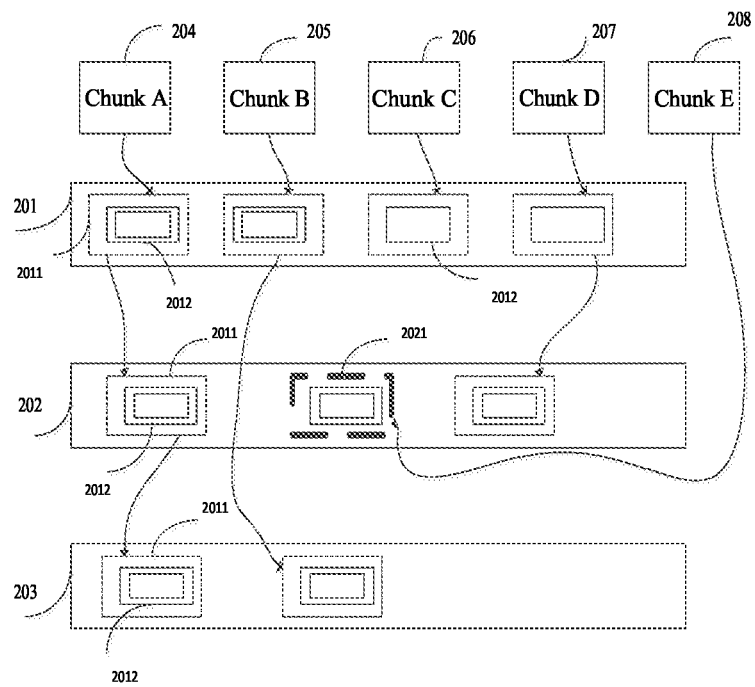
FIG. 2 is a schematic diagram of an index structure in an embodiment of the present application.

The size of a super block is generally measured in GB, e.g., 16 GB. The super block receives storage of a storage record until there is no storage remaining in the super block. Moreover, the chunk may be re-opened after the storage record is deleted so as to receive storage of a new storage record from the beginning. It may be known from the above that a chunk may be stored in a plurality of super blocks. That is, the chunk may be stored in a plurality of super blocks through block segments. Hence, a plurality of chunks may be stored in super blocks in an interlaced manner. As shown in FIG. 2, a plurality of super blocks such as first super block 201, second super block 202, and third super block 203, and a plurality of chunks such as chunk A 204, chunk B 205, chunk C 206, chunk D 207, and chunk E 208 are shown in the index structure 200. The chunk A 204 relates to the storage of the first super block 201, the second super block 202, and the third super block 203. The chunk B 205 relates to the storage of the first super block 201 and the third super block 203. The chunk C 206 relates to the storage of the first super block 201. The chunk D 207 relates to the storage of the first super block 201 and the second super block 202. The chunk E 208 relates to the storage of the second super block 202 (the chunk E 208 is deleted here, but before deletion, it relates to the storage of the second super block 202).

In addition, a super block may be composed of a plurality of (e.g., 4 million) sectors. The size of a sector is generally measured in KB (kilobytes), e.g., 4 KB. Storage records may be completely and contiguously stored in one or more consecutive sectors in the super block. Accordingly, the physical location of a storage record may be represented by a super block identifier (e.g., ID), the first sector identifier (e.g., ID) of the super block, a physical offset with respect to the first sector, and the physical size thereof (which may be determined by the quantity of sector(s)). The physical size of a storage record is associated with the logical size thereof, and may be possibly slightly larger than the logical size thereof. Without loss of generality, storage blocks are served by a single storage device (e.g., hard disk). Thus, storage blocks are not stored across multiple storage devices.

It may be known according to the preceding text that a chunk may be divided logically into a plurality of contiguous block segments. A block segment covers the range of consecutive keys of the storage record it contains, and these consecutive keys may be stored in a super block. The range of keys of a block segment may be represented by [initial offset of a block segment, cut-offset offset of the block segment]. The ranges of keys of different block segments are not intersectant. Storage records are always contained within a block segment, not cross the block segment. In a super block, it is possible that a chunk may have in a plurality of block segments and may be in different super blocks. In this case, the ranges of keys of these block segments cannot be merged to a larger space of contiguous keys, and are thus retained as single block segments. For the block segments, a cloud storage record engine maintains record-level indexes for all storage records corresponding to the ranges of keys of the block segment. This per-segment index of a block segment is referred to as a Chunk Segment Index Meta (CSIM). All CSIMs of a chunk together form record-level indexes for that storage block, and they are linked together in sorted order of the initial offsets of the block segments to generate a CSIM list, thereby allowing for binary lookups.

In order to search for a storage record in a chunk, the CSIM list of the chunk is found in the record-level indexes of the chunk first. Then the list is searched to find a corresponding CSIM. Thus, CSIM may simply provide a mapping from (initial offsets of a storage record) to (the first sector identifier, e.g., ID and the quantity of sector(s)), whereby a block index and a super block ID may be skipped for mapping of sectors. The dedicated upper limit configuration for the physical size of 16 GB super block, 2 GB chunk and 8 MB storage record is 4 KB sector, the initial offset of the storage record may be represented by 31 bits, identifiers, the identification of the first sector, such as the ID, may be represented by 22 bits, and the quantity of sector(s) may be represented by 11 bits. The index entry in each CSIM may then be represented by 8 B (bytes) (1 byte is equal to 8 bits, and thus 8 B=64 bits=31+22+11 bits).

Since a 4 TB (terabytes) storage device may store a billion storage records, and each storage record may have a size of 4 KB, without further memory usage optimization, the CSIMs of this storage device will occupy 8 GB of memory. Each CSIM may be divided into a plurality of index fragments with each index fragment occupying a fixed size, e.g., 512 B, of memory, and represents its (index fragment's) subkey range [initial offset of an index fragment, cut-off offset of the index fragment]. All index fragments of CSIMs are linked together in the sorted order of initial offsets of respective index fragments so as to allow for binary lookups. All storage records whose initial offsets belong to [initial offset of the index fragment, cut-off offset of the index fragment] are compiled as indexes in the corresponding index segments. That is, for the chunk segment corresponding to a plurality of index fragments, it is necessary to divide storage records of the chunk segment, and the divided storage records each correspond to an index fragment. That is, storage records in the logical sub-storage area are divided. Considering the various record attributes of storage records covered by the ranges of subkeys of the index fragments, the memory usage of each index fragment is individually optimized.

As shown in FIG. 2, there is a block segment of a chunk A 204 in each of the first super block 201, the second super block 202, and the third super block 203. There is a CSIM 2011 for each block segment of the chunk A 204, where the CSIM 2011 contains a plurality of index fragments 2012. In addition, the chunk E 208 is fully stored in the first super block 201, and has been marked as 'deleted but not yet been garbage collected', and its corresponding index 2021 has also been marked as 'deleted', but is still located in the memory. Both the second super block 202 and the third super block 203 are in a sealed state, and the first super block 201 remains open for accepting the addition of storage records.

Step 102: determining, according to the divided storage record, corresponding index formats.

An index format (also referred to as an Index Fragment Format) is a created format of an index corresponding to a divided storage record. The index format may include: a header (also referred to as an Index Fragment Header) and a deletion record index. In addition, the index format may also include a middle-level index which may include an index entry group including a plurality of index entries. The plurality of index entries in each group are obtained through the divided index fragments. An index entry corresponds to a storage record.

'Header' of an index fragment: the header (16B) of an index fragment is located at the beginning of the index fragment, which may contain the following key fields: block index (24 bits), format type (8 bits, it means that the index format has different types), basic initial offset (32 bits, the basic initial offset may be an initial offset corresponding to the index fragment), having large storage record (1 bit), having medium storage record (1 bit), having variable logical size (1 bit, relative to a fixed logical size), super block identifier, e.g., ID (24 bits).

The logical size of a storage record may be categorized into three types: small, medium, and large. If all storage records corresponding to the index fragments belong to the same type, the same quantity of bit(s) may be used to represent the logical size of each storage record. The less the logical size of the storage record is, the fewer the bits are used. Similarly, the physical size of a storage record may be categorized into three types according to the quantity of sectors. If all records corresponding to the index fragments belong to the same type, the same quantity of bit(s) may be used to represent the quantity of sector(s) of each record. The logical size and physical size of a record may not be exactly the same, but are relevant. For example, a storage record with a small logical size generally occupies a small number of sectors, through which, the size and variability of a storage record in the header of the index fragment may be determined.

For the deleted record index, when a storage record is deleted, the index entry thereof will be marked as "deleted". Later, when garbage collection occurs, the index entry may be possibly deleted. However, if it is necessary to retain the index entry of this deleted storage record to maintain the contiguity of the key space of the index fragment, a tombstone index entry is used instead of an original index entry. Compared with the complete original index entry, the tombstone index entry take up less memory because it store less content, and the tombstone index entry may store relevant deletion information such as when the corresponding index entry was deleted.

An index entry group is directed to index fragments with no fixed logical size (i.e., storage records corresponding to the index fragments have no fixed logical size, and the logical sizes of the storage records are variable), and the index entries of the index fragments are divided into a plurality of groups. Each group covers the ranges of sub-keys in CSIM corresponding to a plurality of storage records. For each index entry group, index entries therein include a relative initial offset of an initial offset index fragment. The relative initial offset is a basic initial offset with respect to an index fragment (the basic initial offset may be an initial offset of the corresponding index fragment). Then for a corresponding storage record in the index entry group, the initial offset of the storage record may be obtained from the basic initial offset of the index fragment in the same group, the relative initial offset of the group, and the logical size of a preceding storage record. The index entries in the index entry group are stored together and located at the end of the index fragment. The memory usage can be saved through index fragments, without affecting the searching efficiency. The index entries in the index entry group as middle-level indexes in the index fragment may accelerate the searching speed in the index fragment. By using index entries of an index entry group, a search in the index fragment may first check the index entries in the index entry group, and skip to a correct index entry group, so as to reduce linear scanning of the index entries, thereby saving the time for searching and improving the searching efficiency.

It may be known according to the preceding text that determining a corresponding index format may be determining from different types of index formats. The types of index formats may include the following types:

Format_0: When keys in index fragments are contiguous (i.e., the corresponding storage records are also contiguous), the logical size of the storage record is relatively small (e.g., <8 KB; belonging to a small storage record), the physical size of the storage record is relatively small (e.g., <=3 sectors), and the index fragments have small sector spans. That is, the format_0 may be used for any storage record that contains no more than 337 sector identifiers relative to the basic sector identifiers recorded from the format header.

The header of the Format_0 (8B) contains the following key fields: a basic sector identifier, e.g., ID (22 bits, which may be an initial sector identifier of the corresponding index fragment), a maximum relative sector identifier, e.g., ID (10 bits, relative to the basic sector identifier), the quantity of groups (8 bits, referring to the index entry group mentioned above), and an offset of the first index entry group (16 bits, referring to a physical location through which the first index entry group is determined).

An index entry group (4B) contains the following fields: a relative initial offset (23 bits) and a fragment offset of the first index entry (9 bits, referring to a physical location through which the first index entry is determined, and then a corresponding logical storage location is determined through the initial offset). Each group covers 16 index entries.

An index entry (3B) contains the following fields (following the valid bit convention located in a low-byte address): a sector range (bits 0-9, 10 bits), a logical size (bits 10-22, 13 bits), and a tombstone flag (bit 23; 1 bit; =0 (when it is equal to 0, it indicates that it is not a tombstone)). When the value of sector range is 1023, it indicates that the storage record has been deleted. The sector range is calculated as follows: relative sector identifier*3+ (the quantity of sector(s)−1). Correspondingly, the relative sector identifier is determined as (sector range/3), and the quantity of sector(s) is determined as (remainder of sector range/3+1).

The tombstone index entry (2B) of the deleted storage record contains the following key fields: a logical size (bits 2-14, 13 bits), a tombstone flag (bit 15, 1 bit, =1 (=1 indicates that it is a tombstone)). It should be understood that the above bits a to b (e.g., bits 10-22, others are similar) are the order of the occupied bits, which can also be referred to as identifier.

Format_1: When keys in index fragments are contiguous, the logical size of the storage record is medium (<32 KB), the physical size of the storage record is medium (<=9 sectors), and the index fragments have medium sector spans. That is, the Format_1 may be used for any storage record that contains no more than 4096 (about 16 MB) sector identifiers relative to the basic sector identifiers recorded from the format header. Format_1 has the same header format and index entry group format as that of Format_0. No more details will be repeated here. Moreover, each group covers 16 index entries.

An index entry (4B) contains the following fields: a relative sector identifier (bits 0-11, 12 bits), quantity of sector(s) (bits 12-15, 4 bits), logical size (bits 16-30, 15 bits), tombstone flag (bit 31, 1 bit; =0). When the value of the combination of (relative sector identifier, quantity of sector(s)) (2B) is 0xFFFF, this indicates that the storage record has been deleted.

The tombstone index entry (2B) of the deleted storage record contains the following key fields: a logical size (bits 0-14, 15 bits) and a tombstone flag (bits 15, 1 bit; =1).

Format_2: When keys in index fragments are contiguous, the logical size of the record is medium (<32 KB), the physical size of the record is medium (<=9 sectors), and the index fragments have relatively large sector spans. That is, the Format_2 may be used for any record that contains no more than 1 million (about 4 MB) sector identifiers relative to the basic sector identifiers recorded from the format header.

The header of the Format_2 (8B) contains the following key fields: a basic sector identifier (24 bits), the quantity of groups (8 bits), a maximum relative sector identifier (22 bits), and an offset of the first index entry group (10 bits). Format_2 has the same index entry group format as that of Format_0. No more details will be repeated here. Each group covers 8 index entries.

An index entry (5B) contains the following fields: a relative sector identifier (bits 0-19, 20 bits), the quantity of sector(s) (bits 20-23, 4 bits), a logical size (bits 24-38, 15 bits), and a tombstone flag (bit 39, 1 bit; =0). When the value of the combination (3B) of (relative sector identifier, quantity of sector(s)) is 0xFFFFFF, this indicates that the record has been deleted.

The tombstone index entry (2B) of the deleted records contains the following key fields: a logical size (bits 0-14, 15 bits), a tombstone flag (bit 15, 1 bit; =1). After garbage collection, storage records may be re-written, which can make storage records in a chunk become more aggregated. Thus, in the event that the index fragments of Format 2 meets the condition of Format_1, it is converted to Format_1.

Format_3: When keys in index fragments are contiguous, the logical size of the record is relatively large (<8 MB; belonging to large storage record), the physical size of the record is relatively large (<=2048 sectors; 8 MB), and the index fragments have quite large sector spans. That is, the Format_3 may be used for any record that contains no more than 2 million (about 8 MB) sector identifiers relative to the basic sector identifiers recorded from the format header.

The header of the Format_3 (8B) contains the following key fields: a basic sector identifier (24 bits), the quantity of groups (8 bits), a maximum relative sector identifier (23 bits), and an offset of the first index entry group (9 bits).

The index entry group (8B) contains the following fields: a relative initial offset (32 bits), and a fragment offset of the first index entry (9 bits). Each group covers 16 index entries.

An index entry (7B) contains the following fields: a relative sector identifier (bits 0-20, 21 bits), quantity of sector(s) (bits 21-31, 11 bits), a logical size (bits 32-54, 23 bits), and a tombstone flag (bit 55, 1 bit; =0). When the value of the combination of (relative sector identifier, quantity of sector(s)) (4B) is 0xFFFFFFFE, this indicates that the record has been deleted.

A tombstone index entry (3B) of the deleted records contains the following key fields: a logical size (bits 0-22, 23 bits) and a tombstone flag (bit 23, 1 bit; =1).

Format_4: When keys in index fragments are contiguous, and sectors of all records are contiguous or connected together, that is, the records are physically adjacent, Format_4 may be used. The Format_4 has no limitations on the logical size or physical size of a record or on the sector span thereof. The header format of the Format 4 is the same as that of the Format_3. No more details will be repeated here.

An index entry group (8B) contains the following key fields: a relative initial offset (26 bits), a fragment offset of the first index entry (9 bits), and a relative sector identifier (23 bits). Each group covers 16 index entries. The Format_4 accepts records with different sizes. If the logical size of a record is not less than 32 KB or the quantity of sectors is not less than 18, then it is recorded as large (i.e., a large storage record). No matter whether the record is large or non-large, it is recorded in a separate bitstream which is located at the end of an index fragment, just behind the index entry group. No matter whether the record is large or non-large, the index entry will have different sizes accordingly.

An index entry (5B) of a large storage record contains the following fields: quantity of sector(s) (bits 0-12, 13 bits), an adjacency flag (bit 13, 1 bit, "true" indicates that the initial sector identifier is the same as the last sector identifier of a preceding record), a state (bits 14-15, 2 bits; the state includes a flag for deletion), a logical size (bits 16-38, 23 bits), a tombstone flag (bit 39, 1 bit; =0).

A tombstone index entry (3B) of a deleted large record contains the following fields: a logical size (bits 0-22, 23 bits), a tombstone flag (bit 23, 1 bit; =1).

An index entry (3B) of a non-large record contains the following fields: quantity of sector(s) (bits 0-4, 5 bits), an adjacency flag (bit 5, 1 bit, "true" indicates that the initial sector identifier is the same as the last sector identifier of a preceding record), a state (bits 6-7; the state includes a flag for deletion), a logical size (bits 8-22, 15 bits), a tombstone flag (bits 23, 1 bit; =0).

A tombstone index entry (2B) of a deleted non-large record contains the following fields: a logical size (bits 0-14, 15 bits), a tombstone flag (bit 15 bits, 1 bit; =1).

Format_5: When keys in index fragments are contiguous, all records have the same logical size (i.e., a fixed logical size), i.e., medium (<32 KB), the physical size of a record is medium (<=9 sectors), and index fragments have medium sector spans. That is, the Format 5 may be used for any record that contains no more than 4095 (about 16 MB) sector identifiers relative to the basic sector identifiers recorded from the format header.

The header of the Format_5 (8B) contains the following key fields: a basic sector identifier (22 bits), a maximum relative sector identifier (18 bits), a fixed logical size (24 bits). The Format_5 does not contain any index entry group.

An index entry (2B) contains the following fields: a relative sector identifier (bits 0-11, 12 bits), quantity of sector(s) (bits 12-15, 4 bits). For the deleted record, the Format_5 does not have any different tombstone index entry format. When the value of the combination of (relative sector identifier, quantity of sector(s)) (2B) is 0xFFFF, this indicates that the record has been flagged as "deleted". When its value is 0xFFFE, this indicates that the record has become a tombstone.

Format_6: The Format_6 may be used when keys in index fragments are contiguous, all records have the same logical size, i.e., large (<8 MB), and the physical size of the record is also large (<=2048 sectors, 8 MB).

The header of the Format_6 (12B) contains the following key fields: a basic sector identifier (22 bits), a maximum relative sector identifier (23 bits), a fixed logical size (24 bits). The Format_6 does not contain any index entry group.

An index entry (4B) contains the following fields: a relative sector identifier (bits 0-20, 21 bits), quantity of sector(s) (bits 21-31, 11 bits). For the deleted record, the Format_6 does not have any different tombstone index entry format. When the value of the combination of (relative sector identifier, quantity of sector(s)) is 0xFFFFFFFF, this indicates that the record has been deleted. When its value is 0xFFFFFFFE, this indicates that the record has become a tombstone.

Format_7: When keys in index fragments are discrete, that is, a deleted record has no original index entry, the Format_7 may be used. The Format_7 has the same header format and index entry group format as that of the Format 3. No more details will be repeated here. Each group covers 16 index entries.

An index entry (11B) contains the following fields: a relative sector identifier (bits 0-20, 21 bits), quantity of sector(s) (bits 21-31, 11 bits), a logical size (bits 33-55, 23 bits), a relative initial offset (bits 56-86, 31 bits), a tombstone flag (bit 87, 1 bit; =0). The relative initial offset is a basic initial offset with respect to an index fragment. When the value of the combination of (relative sector identifier, quantity of sector(s)) (4B) is 0xFFFFFFFE, this indicates that the record has been deleted.

A tombstone index entry (7B) of a deleted records contains the following key fields: a logical size (bits 1-23, 23 bits), a relative initial offset (bits 24-54, 31 bits), a tombstone flag (bit 55, 1 bit; =1).

Format_8: When keys in index fragments are discrete, the logical size of a record is relatively small (<8 KB), the physical size of the record is relatively small (<=3 sectors), and the index fragments have small sector spans. That is, the Format_8 may be used for any record that contains no more than 337 sector identifiers relative to the basic sector identifiers recorded from the format header, and that has an offset of no more than 32 MB started from the basic initial offset recorded in the header of the index fragment. The Format_8 has the same header format and index entry group format as that of the Format_3. No more details will be repeated here. Each group covers 16 index entries.

An index entry (6B) contains the following fields: a sector range (bits 0-9, 10 bits), a logical size (bits 10-20, 13 bits), and a relative initial offset (bits 23-47, 25 bits) which is a basic initial offset with respect to an index fragment. The Format_8 does not have any different tombstone index entry format for the deleted record. When the value of the sector range is 1023, this indicates that the record has been deleted. When the value of the sector range is 1022, this indicates that the record has become a tombstone. The sector range is calculated as follows: relative sector identifier*3+ (quantity of sector(s)−1). Correspondingly, the relative sector identifier is determined as (sector range/3), and the quantity of sector(s) is derived as: (remainder of sector range/3+1).

It should be further noted that as for discreteness of keys, each record needs an index entry. After a record is deleted, the index entry thereof will be marked as "deleted", but will not be deleted immediately. After garbage collection, within the subkey ranges of index fragments, if the quantity of the deleted records reaches a threshold value, the index fragment can select a record with valid index for re-writing, and skipping the deleted records.

For continuity of keys, every record exists within the subkey ranges of index fragments, that is, each record corresponds to an index entry, the offset between initial offsets of records can be used to optimize the index entry, where the initial offset of the current record may be obtained from the initial offset and logical size of a preceding record.

For the fixed logical size of a record, if an index fragment contains contiguous keys, the record has then an identical fixed logical size, the initial offset of the record may be skipped from the index entry, and the initial offset of the record may be determined directly from the basic initial offset associated with the index fragment.

For the sector span, a record in an index fragment can only span a limited quantity of sectors in a super block. In this case, the sector span of the index fragment has a limited size. The index fragment may have a basic sector identifier. For an individual record, a relative sector identifier (with respect to a basic sector identifier) thereof may be stored for the index entry. According to the size of the span, different bits may be used to indicate the relative sector identifier. The less the span is, the fewer the bits are used. After garbage collection, records in the chunk may be more aggregated, thus reducing the span size.

For sector adjacency, when sectors of all records in an index fragment are adjacent, that is, the initial sector of a record is the same as or immediately follows the cut-off sector of the preceding record thereof (that is, the next sector of a termination sector), the relative sector identifier of the sector may be determined from its preceding sector, and only a flag bit is needed to indicate whether the initial sector of the record is the same as or immediately follows the cut-off sector of the preceding record thereof.

On this basis, the above index format may include an index entry, and may also include a tombstone index entry.

Accordingly, based on above information, the cloud storage recording engine may provide the nine different index fragment formats mentioned above. Except the format of the discrete keys, the sizes of index entries of other formats each are less than 8 B. Each index fragment can independently decide which format to use, that is, the format of each index fragment can be the same or different, thus determining the corresponding index format.

The specific determination approaches may be as follows:

Specifically, determining, according to the divided storage record, the index format matching the record attribute from the plurality of preset index formats, including: selecting, according to a record attribute of the divided storage record, a preset index format in compliance with the record attribute from the plurality of preset index formats, the determined index format being an index format of optional index formats that causes the corresponding sub-index to occupy a minimum memory space.

The record attribute refers to an attribute of a storage record for describing characteristics of the storage record, which may include: logical size, physical size and sector span of a record, continuity of the record, i.e., continuity of keys, and so forth.

The preset index format may refer to the plurality of index formats mentioned above.

It may be known according to the preceding text that the cloud storage recording engine may determine formats corresponding to these record attributes from the plurality of formats mentioned above according to attributes such as logical size, physical size, sector span of a storage record, and continuity of the record. If a plurality of formats may be selected, the most matching format can be selected, which may save the corresponding memory.

The subkey range in an index fragment contains the record attributes mentioned above for further reducing the memory usage of the index entry of each record, so that more index entries may be compressed into each index fragment without affecting the searching efficiency.

More specifically, selecting, according to the record attribute of the divided storage record, the preset index format in compliance with the record attribute from the plurality of preset index formats, including: selecting a corresponding preset index format based on whether the divided storage record being contiguous, a logical size occupied by the storage record, a physical size occupied by the storage record, and a range of a physical sub-storage area occupied by the storage record.

The physical sub-storage area refers to a sub-area of a physical storage area, e.g., a sector of a hard disk. The range of the physical sub-storage area may be a sector span.

For example, it may be known according to the preceding text that the cloud storage recording engine may select a corresponding format according to continuity or discreteness of the above record, and logical size, physical size, and sector span of the record.

It should be noted that what is default here is that the record is a non-fixed record. Thus, the formats suitable for fixed records will be excluded correspondingly.

When a record is continuous, specifically, selecting the corresponding preset index format based on whether the divided storage record being contiguous, the logical size occupied by the storage record, the physical size occupied by the storage record, and the range of the physical sub-storage area occupied by the storage record, including: selecting the preset index format that matches a threshold value from the plurality of preset index formats in case where the divided storage record is contiguous, the logical size occupied by the storage record is less than a logical size threshold value, the physical size occupied by the storage record is less than a physical size threshold value, and the range of the physical sub-storage area occupied by the storage record is less than a range threshold value.

The logical size threshold value, physical size threshold value, and range threshold value may be adjusted according to the approach described in the foregoing. For example, the corresponding records can be with a small size, a medium size, or a large size, no more details will be repeated here. When there are different threshold values, the cloud storage recording engine may select a matched format from formats in compliance with continuity of records according to the preceding text to create a corresponding index.

In addition, in case where the divided record is discrete, the logical size occupied by the record is less than the logical size threshold value, the physical size occupied by the record is less than the physical size threshold value, and the range of the physical sub-storage area occupied by the record is less than the range threshold value, a matched preset index format is selected from a plurality of preset index formats.

It may be known according to the preceding text that in the event that a record is discrete, the cloud storage recording engine may select a matched format from formats in compliance with record discreteness to create a corresponding index. No more details will be repeated here.

Specifically, selecting, according to the record attribute of the divided storage record, the preset index format in compliance with the record attribute from the plurality of preset index formats, including: selecting a matched preset index format from the plurality of preset index formats in case where the divided storage record is contiguous, and a physical storage area occupied by the storage record is contiguous (or the physical sub-storage area is contiguous, e.g., sectors are contiguous, i.e., sectors are adjacent).

According to the preceding text, on the basis that the storage record is contiguous, and sectors are adjacent, the cloud storage recording engine may select a format, i.e., Format_4, to create an index. No more details will be repeated here.

It may be known according to the preceding text that for a fixed record, a corresponding format may also be selected. Specifically, the method 100 further includes: selecting a matched preset index format from the plurality of preset index formats when the logical size occupied by the storage record is the same, the selected preset index format not having a grouped sub-format of a sub-index entry in the sub-index, and sub-formats of tombstone index entries in the sub-index being the same.

According to the preceding text, the cloud storage recording engine may select a format, e.g., Format_5 or Format_6, to create an index on the basis that the storage record is fixed and on the basis of continuity, logical sizes, physical sizes, sector spans of records, and so forth. No more details will be repeated here.

Additionally, in order to quickly create indexes and perform operations such as search and deletion of storage records, the way of satisfying a variety of different record formats, e.g., Format_3 mentioned above may be adopted.

Specifically, determining, according to the divided storage record, the index format matching the record attribute from the plurality of preset index formats, including: selecting, according to the divided storage record, a preset index format that can satisfy different record attributes from the plurality of preset index formats.

For example, according to the preceding text, the cloud storage recording engine may directly select Format_3 which may conform to different record attributes as an index fragment format.

Since Format_3 selected at this time may not be good for saving memory, the format can be converted in case where it may be ensured that corresponding storage records or index fragments have corresponding indexes, thereby saving space without delaying the searching of storage records and the like.

Specifically, after creating the corresponding sub-index according to the determined index format, the method 100 further includes: converting, according to the record attribute of the storage record, the selected preset index format to convert the selected preset index format into another preset index format in the plurality of preset index formats, the converted another preset index format causing a generated corresponding sub-index to occupy a memory space which is less than a memory space occupied by a generated corresponding sub-index caused by the preset index format before conversion.

For example, according to the preceding text, the cloud storage recording engine may convert the format after (or during the process of creating an index fragment) creating an index fragment (explanation of a specific sub-index is also involved below) through Format_3. At this time, for the conversion, a more proper format may be selected in the manner mentioned above to re-create an index. No more details will be repeated here. After the format is converted, the converted format may be used for other index fragments, for example, the converted format is Format_2. Until the Format 2 is not applicable to the storage record, Format_3 is used again as a format of the index fragments by applying the approach mentioned above again, and then the format adjustment is performed, and so on.

It should be noted that it may be known according to the preceding text that when there is a deleted storage record in a chunk (or an index fragment, i.e., a divided storage record), the index entry corresponding to the storage record is also deleted. After the quantity of the deleted storage records reaches a threshold value, the chunk is collected or released, or the undeleted storage records therein are re-written. During the re-writing process, the same storage records deleted in the chunk are preferably re-written together in a new chunk (it may be a newly created chunk, and may also be another chunk) or in a block segment so as to perform format conversion. Under this circumstance, indexes created subsequently occupy less memory. No more details will be repeated here.

The specific conversion process mentioned above may be as follows: converting, according to the record attribute of the storage record, the selected preset index format to convert the selected preset index format into the another preset index format in the plurality of preset index formats, including: converting, based on whether the storage record being contiguous, a logical size occupied by the storage record, a physical size occupied by the storage record, and a range of a physical sub-storage area occupied by the storage record, the selected preset index format to convert the selected preset index format into the another preset index format in the plurality of preset index formats.

Figure 3:
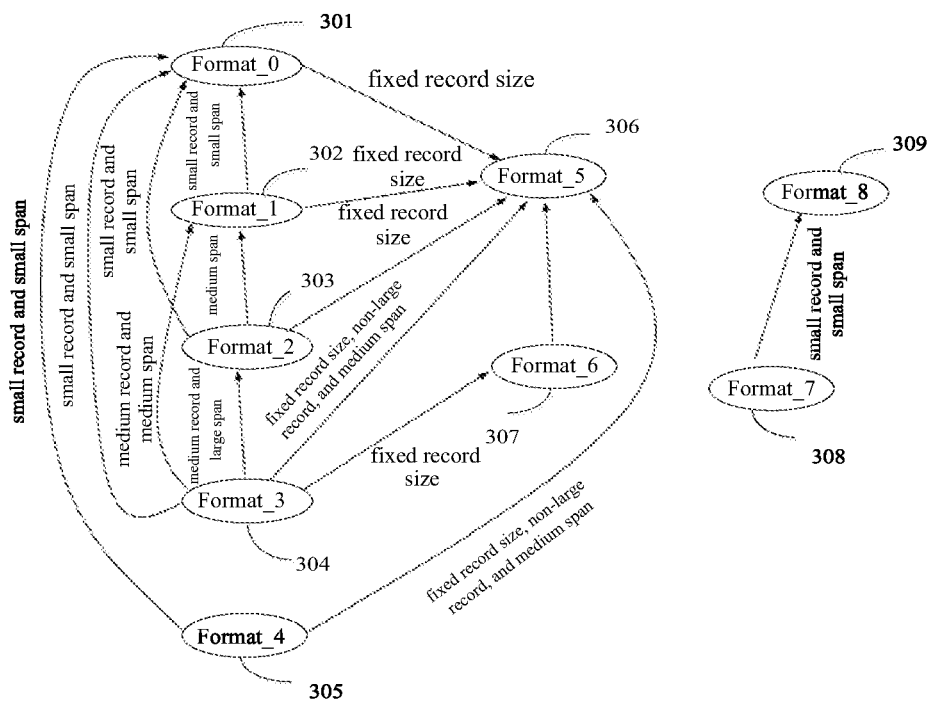
FIG. 3 is a schematic diagram of conversion of an index format in an embodiment of the present application.

The embodiment here is similar to that mentioned in the preceding text. No more details will be repeated here. It is only described that when an index fragment is in an open state, and the index entries corresponding to storage records may be added from a user or a place where garbage is collected, a format with a relatively large amount of memory usage may be used first such that various storage record can be processed. A better format and a less amount of memory usage may be found to index these records by checking more subsequent storage records, so as to perform format conversion. In this case, the index fragment may be converted to a better format. As shown in FIG. 3, possible conversions between different formats are illustrated, with arrows pointing to the better formats. In formats with contiguous keys (i.e., records), Format 3 is the most memory consuming, but is capable of handling a variety of records.

It may be known according to the preceding text that in FIG. 3, Format_3 304 may be converted to Format_2 303 in the event of medium records and large spans, may also be converted to Format_1 302 in the event of medium records and medium spans, may also be converted to Format_0 301 in the event that small records and small spans, may also be converted to Format_5 306 in the event of fixed records, non-large records (i.e., small and medium records), and medium spans, and may also be converted to Format_6 307 in the event of fixed records.

Format_2 303 may be converted to Format_1 302 in the event of medium spans, may also converted to Format_0 301 in the event of small records and small spans, and may also converted to Format_5 306 in the event of fixed records.

Format_1 302 may also be converted to Format_0 301 in the event of small records and small spans, and may also be converted to Format_5 306 in the event of fixed records. Format_0 301 may also be converted to Format_5 306 in the event of fixed records. Format_6 307 may also be converted to Format_5 306 in the event of non-large records (i.e., small and medium records) and medium spans.

Format_4 305 may also be converted to Format_0 301 in the event of small records and small spans, and may also be converted to Format_5 306 in the event of fixed records, non-large records (i.e., small and medium records), and medium spans.

Format_7 308 may also be converted to Format_8 309 in the event of small records and small spans.

In addition, subsequent record attributes corresponding to users may also be predicted according to the historical record attributes of different users. The prediction may be made by a neural network model, and then subsequent record attributes are determined to determine more different formats and format selection modes accordingly. For example, better format and possible format conversion modes may be preset for different users according to the prediction results so as to improve the efficiency of index creation and save memory usage.

Not limited to the above formats, there may be other index fragment formats as follows. For other index fragment formats, it may include: public index fragment header and index fragment header. Additionally, it may further include: record state entry, and so forth.

There may also include: cluster entry and so forth.

When keys in index fragments may be contiguous or discrete, the logical sizes of storage records are fixed (up to 8 MB), the storage records are stored contiguously, the physical sizes of the storage records are fixed (up to 2048 sectors; 8 MB), and the index fragments may have quite large sector spans. That is, Format_9 may be used for any record that contains no more than 2 million (about 8 GB) sector identifiers relative to the basic sector identifiers recorded from the format header. Format_9 may be used for garbage collection writes, and may also be used for real-time writes. The format as follows.

The public index fragment header (16B) is located at the beginning of an index fragment, including the following key fields: a block index (24 bits), a format type (8 bits), a basic initial offset (32 bits), having a large record (1 bit), having a medium record (1 bit), having a variable logical size (1 bit), having a variable physical size (1 bit), the quantity of key(s) (16 bits; i.e., a corresponding quantity of record(s)), and a super block identifier, e.g., ID (24 bits). It should be understood that the meanings thereof are similar to those in the preceding text. No more details will be repeated here.

The header of Format_9 (12B) contains the following key fields: a basic sector identifier, e.g., ID (22 bits), a sector offset of the first storage record (5 bits): aligned per 128 bytes (that, alignment byte-format every 128 bytes), a maximum relative sector identifier, e.g., ID (21 bits), the logical size of a record (24 bits), the physical size of a record (16 bits, with the unit of 128 bytes), having a record state (1 bit), unused (7 bits; reserved bits). When "having a record state" is false, the body (or index body) of this index segment is null. Otherwise, the body contains up to 26 record state entries. Storage records contained in the index fragment with a null body cannot be in a tombstone or deleted state.

Record state entry (18B): a record state bit (16B): each storage record occupies 2 bits, where 00: valid; 01: deleted; 10: falsified.

A tombstone record is a record with a fixed size (128 B), where each element has a size of 16 B, and may include the record states of 64 storage records.

An accumulated quantity of non-tombstone records (16 bits) refers to the total quantity of the non-tombstone records before the current record state entry. Each record state entry covers 64 storage records.

Accordingly, an index fragment in Format_9 with a record state may contain 1664 (=26*64) records. However, an index fragment in Format_9 without any record state may contain up to 64K records (quantity of 16-bit key(s)).

The structural configuration of Format_9 is as follows: public index fragment header+Format_9 header+optional record state entry arrays. The index fragment segmentation: when the record state is set, and the Record X is contained by the index fragment in Format_9 without any record state, the index fragment may be divided into two or three index fragments according to the boundary of 1664 records such that the index fragment containing the Record X may be converted to an index fragment with a record state. Even though the index fragment is not sealed, a record state may still be set. When a record indicating tombstone is added, if the Record X is contained by the index fragment in Format_9 without any record state, the index fragment further needs to be split according to the boundary of 1664 records.

Calculation of a physical location: an offset X of a record is given, the sector identifiers, e.g., ID and quantity of sector(s), of the record are acquired in the following ways:

(1) Parameter of a record=(X-basic initial offset)/logical size of the record. (2) bool beTombstone=FALSE, indicating that there is no tombstone record. (3) If the index fragment is null, physical sizes of all preceding records=parameters of records*physical sizes of records. Otherwise, k=parameter of a record/64; quantities of all preceding conventional records=accumulated quantity of non-tombstone record(s) in record state entry array [k]+quantity of non-tombstone record(s) before k in the record state bit [k]. The quantity of all preceding tombstone records=parameters of records-quantity of all preceding conventional records. The physical sizes of all preceding records=quantity of all preceding conventional records*physical sizes of records+quantity of all preceding tombstone records*1. If the bit of the parameter of a record in the record state bit [k]/64 is "10", and beTombstone=TRUE, this refers to a tombstone record. (4) Intermediate parameter Temp1=sector offset of the first record+physical sizes of all preceding records. (5) Sector identifiers, e.g., ID=basic sector identifier, e.g., ID+Temp1/32, where 32 is the quantity of 128 B units per sector. (6) If beTombstone is TRUE, the quantity of sector(s) is set to 1. (7) Otherwise, intermediate parameter Temp2=Temp1+physical size of a record. The last sector identifier=basic sector identifier+Temp2/32; quantity of sector(s)=last sector identifier-sector identifier+1.

Accordingly, the minimum memory usage for Format_9 is 512 B. In the event of no record state, the memory usage of the index entries per record is very small at 0.06 bit (512/65536). Once a record state is involved, the average memory usage per record is 2.46 bits (512 B/1664).

Format_10: applicable conditions: when keys in index fragments are contiguous, the logical size of a record is fixed (up to 8 MB), and the physical size of the record is fixed (up to 2048 sectors, 8 MB), the index fragment may have quite a large sector span. That is, Format_10 may be used for any record that contains no more than 2 million (about 8 GB) sector identifiers, i.e., ID, relative to the basic sector identifiers recorded from the format header, and the average cluster size>=4. the Format_10 is used for real-time writing. The cluster is defined as a group of records which are contiguous logically and physically. The size of the cluster is defined as the quantity of record(s) in the cluster.

Format_10 adopts the following formats: (1) there is no requirement for aligning the first record. (2) There is no explicit requirement for the size of the cluster. However, the size of the cluster will be automatically detected when a record is added to ensure whether the conditions of Format_10 are satisfied.

The public index fragment header (16B) is located at the beginning of the index fragment, including the following key fields: a block index (24 bits), a format type (8 bits), a basic initial offset (32 bits), having a large record (1 bit), having a medium record (1 bit), having a variable logical size (1 bit), having a variable physical size (1 bit), quantity of key(s) (16 bits), a super block identifier (24 bits).

The Format_10 header (12B) contains the following key fields: a basic sector identifier (22 bits), a maximum relative sector identifier (21 bits), quantity of cluster(s) (7 bits, but up to 101), logical size of a record (24 bits), physical size of the record (16 bits with the unit of 128 bytes), unused (6 bits).

The cluster entry (5B) contains the following fields: the sector identifier of the first record in the cluster (22 bits), the sector offset of the first record in the cluster (5 bits): aligned per 128 bytes, quantity of accumulated records (13 bits): the quantity of records covered from the index fragment to the cluster entry (not included) (quantity interval: [start of the index fragment, the cluster entry).

Record state bit: the record state of each record. Record state (1 bit): 0: valid; 1: deleted. For real-time writing, the record state cannot be a tombstone record.

Structural configuration of Format_10: public index fragment header+Format_10 header+ {cluster entry}+record state bit. Before the index fragment is sealed, the record state bits are stored forward from the end of the index fragment buffer, presenting an inverse storage mode. After sealing, the record state bit will be inversed from the end of the cluster entry array such that the order of the record state bit is stored in a forward mode. Suppose there are C clusters, and each cluster includes R storage records, there will be the following equation: 16+12+5*C+C*R/8=512.

In the event that R=2, C=92, the total quantity of records covered by the index fragment is 184. If R=3, C=89, the total quantity of records is 267. If R=4, C=88, the total quantity of records is 352. If R=8, C=80, the total quantity of records is 640. If R=16, C=68, the total quantity of records is 1088. If R=32, C=52, the total quantity of records is 1696. If R=64, if C=37, the total quantity of records is 2368. If R=128, C=23, the total quantity of records is 2944. If R=256, C=13, the total quantity of records is 3328.

Calculation of a Physical Position:

An offset X of a record is given, sector identifiers, e.g., ID, and quantity of sector(s) of a record may be acquired in the following ways: (1) parameter of the record=(X-basic initial offset)/logical size of the record. (2) the beginning of the cluster entry array is found through 16+12. (3) (parameter of the record+1) is compared with the quantity of accumulated records of the cluster entry through binary search in the cluster entry array so as to search for the first entry with the quantity of accumulated record>=(parameter of the record+1), such that the cluster entry CEx is found. (4) quantity of records in the preceding cluster entry=quantity of accumulated records of CEx. (5) parameter of a record in the cluster=parameter of the record-quantity of records of the preceding cluster entry; (6) intermediate parameter Temp1=sector offset of the first record of CEx+parameter of a record in the cluster*physical size of the record. (7) basic sector identifier of the cluster=basic sector identifier+relative sector identifier of the first record of CEx. (8) sector identifier=basic sector identifier of the cluster+Temp1/32. (9) intermediate parameter Temp2=Temp1+physical size of a record. (10) last sector identifier=basic sector of the cluster+Temp2/32. (11) quantity of sector(s)=last sector identifier-sector identifier ID+1.

As such, when each cluster entry contains 2 records, each record needs 22-bit (=512 B/184) memory. When each cluster entry contains 4 records, each record needs 11.6-bit memory. In the event of each real-time writing, 8 records are added together, and thus the cluster entry at least contains 8 records. Under this circumstance, each record needs 6.4-bit memory. In fact, it is possible to contiguously find more than 8 records, e.g., 16 records. If this is the case, each record needs 3.8-bit (=512 B/1088) memory. When each cluster entry contains 32 records, each record needs 2.4-bit memory. When each cluster entry contains 256 records, each record needs 1.2-bit memory. These examples are close enough to the memory usage of the Format_9 usage state. Assuming that during real-time writing, 8 records are written per increment. In a stable state, the amount of memory usage per record is calculated as follows: 30%*Format_10+70%*Format_9=6.4*30%+2.46*70%=3.64 bits. For an 8 T (terabyte) storage device, each record occupies 4 KB, and the amount of memory usage is (2G*3.64 bits)=0.91 GB.

Format selection algorithm or manner: for real-time writing, Format_3 may be selected first. In the event of a fixed logical size, if an average size of clusters is less than 2 or it is the non-fixed physical size, the format will be converted to Format_5 or Format_6. If an average size of clusters is <4, and if the Format_5 condition is satisfied, the format will be converted to Format_5. Otherwise, the format will be converted to Format_10. If an average size of clusters>=4, the format will be converted to Format_10. For writing of garbage collection, Format_9 will be selected if a record has a fixed logical size, a fixed physical size, and contiguous physical sectors.

Specifically, selecting, according to the record attribute of the divided storage record, the preset index format in compliance with the record attribute from the plurality of preset index formats, including: selecting a corresponding preset index format based on the fact that the logical size occupied by the divided storage record is the same, the physical size occupied by the storage records is the same, and based on the range of the physical sub-storage area occupied by the storage record.

More specifically, a corresponding preset index format is selected based on the fact that the logical size occupied by the divided storage record is the same, the physical size occupied by the storage records is the same, and the range of the physical sub-storage area occupied by the storage record belongs to a large range (less than a range threshold value), and the storage records are stored contiguously.

According to the preceding text, the cloud storage recording engine may selects Format_9 as an index format in case where records belong to a fixed size, the storage records are stored contiguously, and the sector spans belong to a large span. No more details will be repeated here.

In addition, an index fragment format without any record state is split according to the quantity of records corresponding to index fragment formats with a record state, so that the index fragment format without any record state is converted to an index fragment format with a record state. No more details will be repeated here.

Specifically, selecting, according to the record attribute of the divided storage record, the preset index format in compliance with the record attribute from the plurality of preset index formats, including: selecting a corresponding preset index format based on the fact that the divided storage record is contiguous, a logical size occupied by the storage record is the same, a physical size occupied by the storage record is the same, based on a range of a physical sub-storage area occupied by the storage record, and a quantity of record cluster is greater than a quantity threshold value, the record cluster being composed of a plurality of storage records that occupy consecutive logical positions and consecutive physical sub-storage areas.

According to the preceding text, the cloud storage recording engine may select Format_10 as an index format in case where records are contiguous, the records belong to a fixed size, sector spans belong to a large span, and the quantity of clusters is greater than a threshold value. No more details will be repeated here.

In addition, for an index fragment, when the corresponding records is increasing, it is necessary to detect the quantity of records in a corresponding record cluster such that the quantity of records is greater than a quantity threshold value. No more details will be repeated here.

S104: creating a corresponding sub-index according to the determined index format to perform a lookup on the storage record according to the sub-index.

The sub-index refers to the index fragment mentioned above.

According to the preceding text, after determining a corresponding format, the cloud storage recording engine creates an index fragment according to the format, then generates a corresponding CSIM, and finally generates an index of a chunk, thereby realizing the determination of an index corresponding to the storage record, and making it possible to locate the storage record in the physical storage area.

During operations, e.g., search and deletion of records, according to the preceding text, a user sends a request for reading through a computer interface, and invokes the API of a cloud server according to the request to search for records and read the same. According to the contents above, a corresponding record is searched by using an index fragment, and the searched record is read and returned to the user's computer for the user's check.

Figure 4:
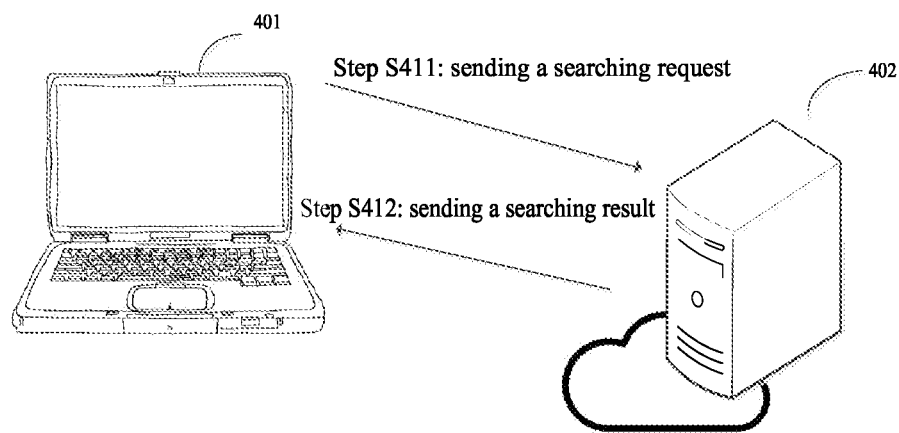
FIG. 4 is a schematic structural diagram of an index creation system in an embodiment of the present application.

FIG. 4 is a schematic structural diagram of an index creation system provided in an embodiment of the present application. As shown in FIG. 4, the system 400 may include: a first device 401 and a second device 402.

The first device 401 may be a device with a computing capability which may implement the function of sending data to the second device 402, and may also receive data from the second device 402. The basic structure of the first device 401 may include: at least one processor. The quantity of processor(s) may depend on the configuration and type of an apparatus with a computing capability. The apparatus with a computing capability may also include a memory which may be volatile, e.g., RAM, may also be no-volatile, such read-only memory (ROM) and flash memory, or may also include both types at the same time. Generally, an operating system (OS), and one or more application programs are stored in the memory, and program data may also be stored. In addition to the processing unit and the memory, the apparatus with a computing capability further includes some basic configurations, such as network a card chip, an IO bus, a display component, and some peripheral devices. In an example, some peripheral devices may include, for example, a keyboard, an input pen, and so forth. Other peripheral devices are well known in the art. No more details will be repeated here. In an example, the first device 401 may be an intelligent terminal, e.g., a cell phone, a desktop computer, a laptop, and a tablet PC, and the like.

The second device 402 refers to a device capable of providing computing services in a virtual network environment, and may be a device for record storage and index creation by using a network. In terms of physical implementation, the second device 402 may be any device capable of providing computing services, responding to a request for service, and storing a record, and creating an index. For example, it may be a cloud server, a cloud host, a virtual center, a conventional server, and so forth, with a database built on it. The second device 402 is mainly composed of a processor, a hard disk, a memory, a system bus, and so forth, and is similar to the architecture of a general-purpose computer.

Specifically, the second device 402 is used for dividing, based on a storage record and a logical sub-storage area of a logical storage area divided over a physical storage area, a storage record in the logical sub-storage area, the storage record including storage data; determining, according to the divided storage record, an index format matching a record attribute from a plurality of preset index formats; creating a corresponding sub-index according to the determined index format to perform a lookup on the storage record according to the sub-index, the index format causing the created corresponding sub-index to occupy a memory space less than a preset capacity.

In addition, the first device 401 sends a request for storage (it may also be a request for writing) to the second device 402 such that the second device 402 performs a record storage according to the request for storage. After the record storage is completed, an index creation of the record may be performed.

In one implementation a second device 402 selects, according to a record attribute of the divided storage record, a preset index format in compliance with the record attribute from the plurality of preset index formats, the determined index format being an index format of optional index formats that causes the corresponding sub-index to occupy a minimum memory space.

Specifically, the second device 402 selecting, according to the divided storage record, a preset index format that can satisfy different record attributes from the plurality of preset index formats.

In addition, after creating the corresponding sub-index according to the determined index format, the second device 402 coverts, according to the record attribute of the storage record, the selected preset index format to convert the selected preset index format into another preset index format in the plurality of preset index formats, the converted another preset index format causing a generated corresponding sub-index to occupy a memory space which is less than a memory space occupied by a generated corresponding sub-index caused by the preset index format before conversion.

Specifically, the second device 402 selects a corresponding preset index format based on whether the divided storage record being contiguous, a logical size occupied by the storage record, a physical size occupied by the storage record, and a range of a physical sub-storage area occupied by the storage record.

Specifically, the second device 402 converts, based on whether the storage record being contiguous, a logical size occupied by the storage record, a physical size occupied by the storage record, and a range of a physical sub-storage area occupied by the storage record, the selected preset index format to convert the selected preset index format into the another preset index format in the plurality of preset index formats.

Specifically, the second device 402 selects the preset index format that matches a threshold value from the plurality of preset index formats in case where the divided storage record is contiguous, the logical size occupied by the storage record is less than a logical size threshold value, the physical size occupied by the storage record is less than a physical size threshold value, and the range of the physical sub-storage area occupied by the storage record is less than a range threshold value.

Specifically, the second device 402 selects a matched preset index format from the plurality of preset index formats in case where the divided storage record is contiguous, and a physical storage area occupied by the storage record is contiguous.

In addition, the second device 402 selects a matched preset index format from the plurality of preset index formats in case where the logical size occupied by the storage record is the same, the selected preset index format not having a grouped sub-format of a sub-index entry in the sub-index, and sub-formats of tombstone index entries in the sub-index being the same.

Specifically, the second device 402 selects a corresponding preset index format based on the fact that the logical size occupied by the divided storage record is the same, the physical size occupied by the storage records is the same, and based on the range of the physical sub-storage area occupied by the storage record.

Specifically, the second device 402 selects a corresponding preset index format based on the fact that the divided storage record is contiguous, a logical size occupied by the storage record is the same, a physical size occupied by the storage record is the same, a range of a physical sub-storage area occupied by the storage record, and a quantity of record cluster is greater than a quantity threshold value, the record cluster being composed of a plurality of storage records that occupy consecutive logical positions and consecutive physical sub-storage areas.

It should be noted that for contents that are not fully elaborated in the system 400, reference may be made to contents in the method 100 mentioned above. For the specific implementation thereof, please also refer to the specific implementation of the method 100 described in the preceding section. No more details will be repeated here.

In the scenario of index creation of storage records in cloud in the embodiments of the present application, as shown in FIG. 4, a user may log in to a login interface of a second device 402 (e.g., a cloud server) through a web browser on a first device 401 (e.g., computer). The user logs in through the login interface, and then the interface skips to a storage service interface, through which the user sends a request for storage to the cloud server. The request performs data storage, e.g., storing a document, by invoking the API (Application Programming Interface) provided by the cloud server (the request can carry the stored document or a part of the stored document). After receiving the request, the cloud server may store, by invoking the API, a document in the manner described above into a chunk corresponding to a super block provided by a hard disk. Once the storage is completed, a storage record including storage data is obtained. The cloud storage recording engine may perform processing on the basis of the storage records, e.g., acquiring these storage records or reading these storage records, and then performing segmentation, and index creation.

The chunk may be logically divided into a plurality of contiguous block segments which cover the ranges of contiguous keys of the storage records it contains. These contiguous keys may be stored in a super block. The block segments may be in different super blocks. The cloud storage recording engine may divide storage records corresponding to the block segments, and the divided storage records each correspond to an index fragment. The cloud storage recording engine may select a corresponding format according to continuity or discreteness of the divided storage records, and the logical sizes, physical sizes, and sector spans of the records, and the like, then create an index fragment, and generate an index corresponding to a complete storage record.

Alternatively, the cloud storage recording engine may create an index fragment according to a divided storage record and the above Format_3, and may convert the format after the fragment creation. At this time, for the conversion, a more proper format may be selected in the manner mentioned above to re-create an index. After the format is converted, the converted format may be used for other index fragments, for example, the converted format is Format_2 mentioned above. Until the Format_2 is not applicable to the storage record, Format_3 is used again as a format of the index fragments by applying the approach mentioned above again, and then the format adjustment is performed, and so on. Accordingly, an index of a complete storage record may be created.

After the index creation is completed, Step S411 is executed: the API of a cloud server is invoked according to a request sent by a user through a computer interface to search for and read a record. A corresponding record is searched by using an index fragment, and the searched storage data is read and returned to the user's computer. That is, Step 412 is executed: a searching result is sent for the user's check.

For the contents not described in a detailed manner here, reference may be made to the contents descripted above. No more details will be repeated here.

In the above embodiment, the first device 401 and the second device 402 are connected to a network. If the first device 401 and the second device 402 are communicatively connected, the network type of the mobile network may be any one of 2G (GSM), 2.5G (GPRS), 3G (WCDMA, TD-SCDMA, CDMA2000, and UTMS), 4G (LTE), 4G+ (LTE+), WiMax, and 5G, and the like.

Figure 5:
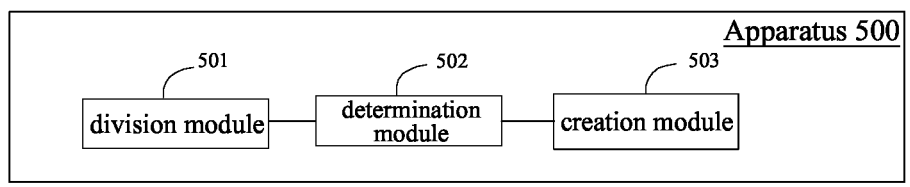
FIG. 5 is a schematic structural diagram of an index creation apparatus provided in an embodiment of the present application.

FIG. 5 is a schematic structural diagram of an index creation apparatus provided in an embodiment of the present application. The apparatus 500 may be applied in a server. The apparatus 500 includes: a division module 501, a determination module 502, and a creation module 503. The functions of respective modules are illustrated in a detailed manner below.

The division module 501 is used for dividing, based on a storage record and a logical sub-storage area of a logical storage area divided over a physical storage area, a storage record in the logical sub-storage area. The storage record includes storage data.

The determination module 502 is used for determining, according to the divided storage record, an index format matching a record attribute from a plurality of preset index formats.

The creation module 503 is used for creating a corresponding sub-index according to the determined index format to perform a lookup on the storage record according to the sub-index, the index format causing the created corresponding sub-index to occupy a memory space less than a preset capacity.

Specifically, the determination module 502 is used for selecting, according to a record attribute of the divided storage record, a preset index format in compliance with the record attribute from the plurality of preset index formats, the determined index format being an index format of optional index formats that causes the corresponding sub-index to occupy a minimum memory space.

Specifically, the determination module 502 is used for selecting, according to the divided storage record, a preset index format that can satisfy different record attributes from the plurality of preset index formats.

In addition, after creating the corresponding sub-index according to the determined index format, the apparatus 500 further includes: a conversion module for converting, according to the record attribute of the storage record, the selected preset index format to convert the selected preset index format into another preset index format in the plurality of preset index formats, the converted another preset index format causing a generated corresponding sub-index to occupy a memory space which is less than a memory space occupied by a generated corresponding sub-index caused by the preset index format before conversion.

Specifically, the determination module 502 is used for selecting a corresponding preset index format based on whether the divided storage record being contiguous, a logical size occupied by the storage record, a physical size occupied by the storage record, and a range of a physical sub-storage area occupied by the storage record.

Specifically, the conversion module is used for converting, based on whether the storage record being contiguous, a logical size occupied by the storage record, a physical size occupied by the storage record, and a range of a physical sub-storage area occupied by the storage record, the selected preset index format to convert the selected preset index format into the another preset index format in the plurality of preset index formats.

Specifically, the determination module 502 is used for selecting the preset index format that matches a threshold value from the plurality of preset index formats in case where the divided storage record is contiguous, the logical size occupied by the storage record is less than a logical size threshold value, the physical size occupied by the storage record is less than a physical size threshold value, and the range of the physical sub-storage area occupied by the storage record is less than a range threshold value.

Specifically, the determination module 502 is used for selecting a matched preset index format from the plurality of preset index formats in case where the divided storage record is contiguous, and a physical storage area occupied by the storage record is contiguous.

In addition, the apparatus 500 further includes: a selection module for selecting a matched preset index format from the plurality of preset index formats in case where the logical size occupied by the storage record is the same, the selected preset index format not having a grouped sub-format of a sub-index entry in the sub-index, and sub-formats of tombstone index entries in the sub-index being the same.

Specifically, the determination module 502 is used for selecting a corresponding preset index format based on the fact that the logical size occupied by the divided storage record is the same, the physical size occupied by the storage records is the same, and based on the range of the physical sub-storage area occupied by the storage record.

Specifically, the determination module 502 is used for selecting a corresponding preset index format based on the fact that the divided storage record is contiguous, a logical size occupied by the storage record is the same, a physical size occupied by the storage record is the same, based on a range of a physical sub-storage area occupied by the storage record, and a quantity of record cluster is greater than a quantity threshold value, the record cluster being composed of a plurality of storage records that occupy consecutive logical positions and consecutive physical sub-storage areas.

For the contents regarding the apparatus 500 not illustrated in a detailed manner, reference may be made to the above description. No more details will be repeated here.

Figure 6:
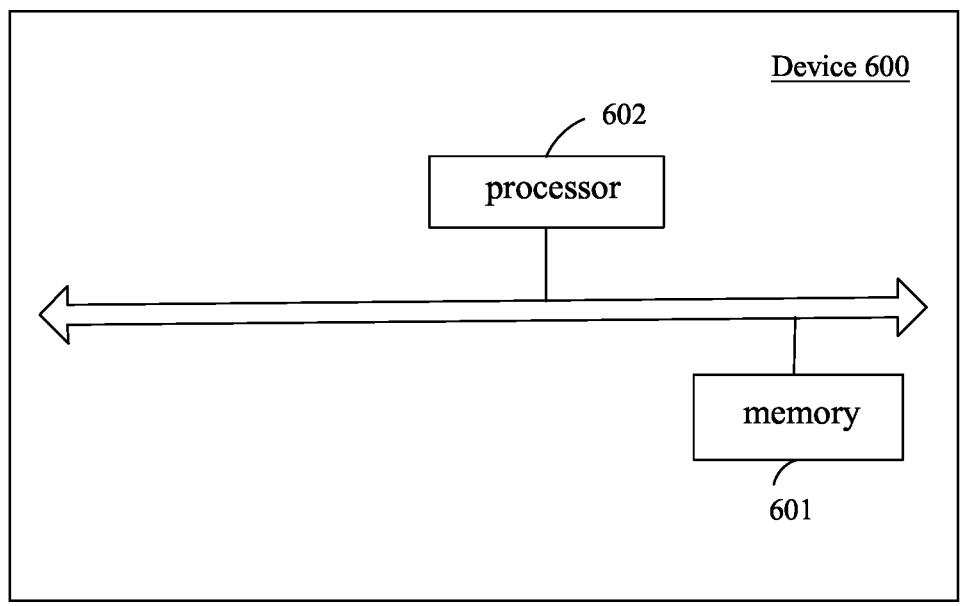
FIG. 6 is a schematic structural diagram of a computing device provided in an embodiment of the present application.

The inner function and structure of the apparatus 500 shown in FIG. 5 are described above. In a possible design, the structure of the apparatus 500 shown in FIG. 5 may be implemented as a computing device, e.g., a server. As shown in FIG. 6, the device 600 may include: a memory 601 and a processor 601.

The memory 601 is used for storing a computer program.

The processor 602 is used for executing the computer program to: divide, based on a storage record and a logical sub-storage area of a logical storage area divided over a physical storage area, a storage record in the logical sub-storage area, the storage record including storage data; determine, according to the divided storage record, an index format matching a record attribute from a plurality of preset index formats; create a corresponding sub-index according to the determined index format to perform a lookup on the storage record according to the sub-index, the index format causing the created corresponding sub-index to occupy a memory space less than a preset capacity.

Specifically, the processor 602 is specifically used for selecting, according to a record attribute of the divided storage record, a preset index format in compliance with the record attribute from the plurality of preset index formats, the determined index format being an index format of optional index formats that causes the corresponding sub-index to occupy a minimum memory space.

Specifically, the processor 602 is specifically used for selecting, according to the divided storage record, a preset index format that can satisfy different record attributes from the plurality of preset index formats.

Additionally, after creating the corresponding sub-index according to the determined index format, the processor 602 is further used for converting, according to the record attribute of the storage record, the selected preset index format to convert the selected preset index format into another preset index format in the plurality of preset index formats, the converted another preset index format causing a generated corresponding sub-index to occupy a memory space which is less than a memory space occupied by a generated corresponding sub-index caused by the preset index format before conversion.

Specifically, the processor 602 is used for selecting a corresponding preset index format based on whether the divided storage record being contiguous, a logical size occupied by the storage record, a physical size occupied by the storage record, and a range of a physical sub-storage area occupied by the storage record.

Specifically, the processor 602 is used for converting, based on whether the storage record being contiguous, a logical size occupied by the storage record, a physical size occupied by the storage record, and a range of a physical sub-storage area occupied by the storage record, the selected preset index format to convert the selected preset index format into the another preset index format in the plurality of preset index formats.

Specifically, the processor 602 is used for selecting the preset index format that matches a threshold value from the plurality of preset index formats in case where the divided storage record is contiguous, the logical size occupied by the storage record is less than a logical size threshold value, the physical size occupied by the storage record is less than a physical size threshold value, and the range of the physical sub-storage area occupied by the storage record is less than a range threshold value.

Specifically, the processor 602 is used for selecting a matched preset index format from the plurality of preset index formats in case where the divided storage record is contiguous, and a physical storage area occupied by the storage record is contiguous.

In addition, the processor 602 is further used for selecting a matched preset index format from the plurality of preset index formats in case where the logical size occupied by the storage record is the same, the selected preset index format not having a grouped sub-format of a sub-index entry in the sub-index, and sub-formats of tombstone index entries in the sub-index being the same.

Specifically, the processor 602 is used for selecting a corresponding preset index format based on the fact that the logical size occupied by the divided storage record is the same, the physical size occupied by the storage records is the same, and based on the range of the physical sub-storage area occupied by the storage record.

Specifically, the processor 602 is used for selecting a corresponding preset index format based on the fact that the divided storage record is contiguous, a logical size occupied by the storage record is the same, a physical size occupied by the storage record is the same, based on a range of a physical sub-storage area occupied by the storage record, and a quantity of record cluster is greater than a quantity threshold value, the record cluster being composed of a plurality of storage records that occupy consecutive logical positions and consecutive physical sub-storage areas.

In addition, the embodiments of the present invention provide a computer program product including a computer program or an instruction, where the computer program, when executed by a processor, causes the processor to implement steps of an index creation method in method embodiments of FIG. 1 to FIG. 3.

The embodiments of the present invention provide a computer storage medium. The computer program, when executed by one or more processors, causes the one or more processors to implement steps of an index creation method in method embodiments of FIG. 1 to FIG. 3. No more details will be repeated here.

In addition, in some processes described in the embodiments and accompanying drawings above, a plurality of operations occurring in a particular order are included. However, it should be clearly understood that these operations may not be executed according to the order occurring herein or they may be executed in parallel. The sequence numbers, e.g., 101, 102, and 103, of the operations are merely used to distinguish various different operations, and the sequence numbers themselves do not represent any execution sequences. In addition, these procedures may include more or fewer operations, and these operations may be performed sequentially or in parallel. It needs to be appreciated that the terms such as "first" and "second" herein are intended to distinguish different messages, devices, modules, etc., and do not represent a sequential order, nor does they define that "first" and "second" are of different types.

The embodiments of the apparatus described above are merely illustrative, where the units described as separate parts may be or may not be physically separated, the parts shown as units may be or may not be physical units, i.e., they can be located in one place, or distributed in a plurality of network units. One can select some or all the modules according to actual needs to achieve the solution of the present embodiment. Those ordinary skilled in the art can understand and implement the solution without involving any inventive effort.

Through description of the embodiments above, it is clear to those skilled in the art that the respective embodiments may be implemented by means of software plus a necessary general-purpose hardware platform, or by means of combining hardware with software. Based on such an understanding, the above-described technical solutions may be in essence or a portion thereof making contribution over the prior art may be embodied in the form of a computer product. The present invention may adopt a form of computer program product implemented on one or more storage media available to computers (including but not limited to magnetic disk storages, CD-ROMs, optical memories and so forth) containing program codes available to computers.

The present invention is described with reference to flow diagrams and/or block diagrams of the method, device (system), and computer program product in the embodiments of the present invention. It should be understood that each flow and/or block in the flow diagrams and/or block diagrams as well as a combination of a flow and/or block in the flow diagrams and/or block diagrams may be implemented by computer program instructions. These computer program instructions may be provided to a general-purpose computer, a special-purpose computer, an embedded processor or processors of other programmable devices to generate a machine such that instructions executed by computers or processors of other programmable devices are generated for implementing an apparatus with functions designated in a flow or a plurality of flows in the flow diagrams and/or a block or a plurality of blocks in the block diagrams.

These computer program instructions may also be stored in computer-readable memory capable of directing a computer or other programmable multimedia data processing device to operate in a particular manner, such that the instructions stored in that computer-readable memory produce an article of manufacture including an instructional device that implements a function specified in one or more processes of a flowchart and/or one or more blocks of a block diagram.

These computer program instructions may also be loaded in computers or other programmable multimedia data processing devices such that a series of operating steps are executed on the computers or other programmable devices to produce computer-implemented processing, such that the instructions executed on the computers or other programmable devices provide steps for implementing a function specified in one or more processes of a flowchart and/or one or more blocks of a block diagram.

In a typical configuration, a computing device includes one or more processors (CPU), an input/output interface, a network interface, and a memory.

The memory may include a non-permanent memory in computer readable media, a random-access memory (RAM) and/or non-volatile memory, and other forms such as a read-only memory (ROM) or a flash memory (flash RAM). The memory is an example of computer readable media.

The computer-readable media include permanent and non-permanent, removable and non-removable media that may implement information storage with any method or technology. The information may be computer readable instructions, data structures, modules of a program or other data. Examples of computer storage media include but not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette tape, a magnetic tape/disk storage or other magnetic storage devices or any other non-transmission media that may be used for storing information that is accessible to a computing device. According to the definition herein, the computer readable media do not include transitory computer readable media (transitory media) such as modulated data signals and carrier waves.

It should be noted that the embodiments above are only for illustrating the technical solutions of the present invention, not for limiting them. Although the present invention is described in a detailed manner with reference to the preceding embodiments, those skilled in the art should understand that it is possible to make modifications to the technical solutions described in the foregoing embodiments, or conduct equivalent replacements of some technical features therein. These modifications or replacements do not make the essence of corresponding technical solutions depart from the spirt and principles of the technical solutions in respective embodiments in the present invention.

What is claimed is:

1. An index creation method, implemented by a computing device, comprising:
    dividing, based on a storage record and a logical sub-storage area of a logical storage area divided over a physical storage area, a storage record in the logical sub-storage area, the storage record comprising storage data, wherein the logical storage area and the physical storage area are provided by a physical storage device;
    determining, according to the divided storage record, an index format matching a record attribute from a plurality of preset index formats;
    creating a corresponding sub-index according to the determined index format to perform a lookup on the storage record according to the sub-index, the index format causing the created corresponding sub-index to occupy a memory space less than a preset capacity.

2. The method according to claim 1, determining, according to the divided storage record, the index format matching the record attribute from the plurality of preset index formats, comprising:
    selecting, according to a record attribute of the divided storage record, a preset index format in compliance with the record attribute from the plurality of preset index formats, the determined index format being an index format of optional index formats that causes the corresponding sub-index to occupy a minimum memory space.

3. The method according to claim 1, determining, according to the divided storage record, the index format matching the record attribute from the plurality of preset index formats, comprising:
    selecting, according to the divided storage record, a preset index format that can satisfy different record attributes from the plurality of preset index formats.

4. The method according to claim 3, after creating the corresponding sub-index according to the determined index format, further comprising:
    converting, according to the record attribute of the storage record, the selected preset index format to convert the selected preset index format into another preset index format in the plurality of preset index formats, the converted another preset index format causing a generated corresponding sub-index to occupy a memory space which is less than a memory space occupied by a generated corresponding sub-index caused by the preset index format before conversion.

5. The method according to claim 2, selecting, according to the record attribute of the divided storage record, the preset index format in compliance with the record attribute from the plurality of preset index formats, comprising:
    selecting a corresponding preset index format based on whether the divided storage record being contiguous, a logical size occupied by the storage record, a physical size occupied by the storage record, and a range of a physical sub-storage area occupied by the storage record.

6. The method according to claim 4, converting, according to the record attribute of the storage record, the selected preset index format to convert the selected preset index format into the another preset index format in the plurality of preset index formats, comprising:

converting, based on whether the storage record being contiguous, a logical size occupied by the storage record, a physical size occupied by the storage record, and a range of a physical sub-storage area occupied by the storage record, the selected preset index format to convert the selected preset index format into the another preset index format in the plurality of preset index formats.

7. The method according to claim 5, selecting the corresponding preset index format based on whether the divided storage record being contiguous, the logical size occupied by the storage record, the physical size occupied by the storage record, and the range of the physical sub-storage area occupied by the storage record, comprising:
selecting the preset index format that matches a threshold value from the plurality of preset index formats in case where the divided storage record is contiguous, the logical size occupied by the storage record is less than a logical size threshold value, the physical size occupied by the storage record is less than a physical size threshold value, and the range of the physical sub-storage area occupied by the storage record is less than a range threshold value.

8. The method according to claim 2, selecting, according to the record attribute of the divided storage record, the preset index format in compliance with the record attribute from the plurality of preset index formats, comprising:
selecting a matched preset index format from the plurality of preset index formats in case where the divided storage record is contiguous, and a physical storage area occupied by the storage record is contiguous.

9. The method according to claim 7, further comprising:
selecting a matched preset index format from the plurality of preset index formats in case where the logical size occupied by the storage record is the same, the selected preset index format not having a grouped sub-format of a sub-index entry in the sub-index, and sub-formats of tombstone index entries in the sub-index being the same.

10. The method according to claim 2, selecting, according to the record attribute of the divided storage record, the preset index format in compliance with the record attribute from the plurality of preset index formats, comprising:
selecting a corresponding preset index format based on the fact that the logical size occupied by the divided storage record is the same, the physical size occupied by the storage records is the same, and based on the range of the physical sub-storage area occupied by the storage record.

11. The method according to claim 2, selecting, according to the record attribute of the divided storage record, the preset index format in compliance with the record attribute from the plurality of preset index formats, comprising:
selecting a corresponding preset index format based on the fact that the divided storage record is contiguous, a logical size occupied by the storage record is the same, a physical size occupied by the storage record is the same, on a range of a physical sub-storage area occupied by the storage record, and a quantity of record cluster is greater than a quantity threshold value, the record cluster being composed of a plurality of storage records that occupy consecutive logical positions and consecutive physical sub-storage areas.

12. A non-transitory computer-readable storage medium stored with a computer program which, when executed by one or more processors, enables the one or more processors to implement steps of the method of claim 1.

13. A non-transitory computer-readable storage medium stored with a computer program which, when executed by one or more processors, enables the one or more processors to implement steps of the method of claim 2.

14. A non-transitory computer-readable storage medium stored with a computer program which, when executed by one or more processors, enables the one or more processors to implement steps of the method of claim 3.

15. A non-transitory computer-readable storage medium stored with a computer program which, when executed by one or more processors, enables the one or more processors to implement steps of the method of claim 4.

16. A non-transitory computer-readable storage medium stored with a computer program which, when executed by one or more processors, enables the one or more processors to implement steps of the method of claim 5.

17. A non-transitory computer-readable storage medium stored with a computer program which, when executed by one or more processors, enables the one or more processors to implement steps of the method of claim 6.

18. A non-transitory computer-readable storage medium stored with a computer program which, when executed by one or more processors, enables the one or more processors to implement steps of the method of claim 7.

19. A non-transitory computer-readable storage medium stored with a computer program which, when executed by one or more processors, enables the one or more processors to implement steps of the method of claim 8.

20. A non-transitory computer-readable storage medium stored with a computer program which, when executed by one or more processors, enables the one or more processors to implement steps of the method of claim 9.

* * * * *